United States Patent
Wang et al.

(10) Patent No.: US 7,860,023 B2
(45) Date of Patent: Dec. 28, 2010

(54) LAYER 2 NETWORK RULE-BASED NON-INTRUSIVE TESTING VERIFICATION METHODOLOGY

(75) Inventors: Zhenzhen Wang, Holmdel, NJ (US);
Paritosh Bajpay, Edison, NJ (US);
Jackson Liu, Middletown, NJ (US);
Teh-Hsin Wu, Holmdel, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 123 days.

(21) Appl. No.: 12/288,496

(22) Filed: Oct. 21, 2008

(65) Prior Publication Data

US 2010/0097944 A1 Apr. 22, 2010

(51) Int. Cl.
*H04J 1/16* (2006.01)
(52) U.S. Cl. ........................... 370/252; 709/224
(58) Field of Classification Search ............... None
See application file for complete search history.

(56) References Cited

U.S. PATENT DOCUMENTS

| | | | |
|---|---|---|---|
| 6,574,197 B1 * | 6/2003 | Kanamaru et al. ......... 370/252 |
| 6,711,135 B1 * | 3/2004 | Dziekan et al. ............ 370/242 |
| 2002/0089999 A1 * | 7/2002 | Binde ....................... 370/465 |
| 2003/0110250 A1 * | 6/2003 | Schnitzer et al. ........... 709/224 |
| 2004/0109450 A1 * | 6/2004 | Kang et al. ................ 370/390 |
| 2006/0120282 A1 * | 6/2006 | Carlson et al. ............. 370/229 |
| 2006/0228113 A1 * | 10/2006 | Cutillo et al. ............... 398/71 |
| 2007/0047631 A1 * | 3/2007 | Bostoen et al. ............ 375/222 |
| 2007/0109974 A1 * | 5/2007 | Cutillo et al. .............. 370/254 |
| 2008/0170853 A1 * | 7/2008 | Rakib et al. ............... 398/26 |
| 2008/0298444 A1 * | 12/2008 | Cioffi et al. ............... 375/222 |
| 2009/0207985 A1 * | 8/2009 | Cioffi et al. ............. 379/93.01 |

* cited by examiner

*Primary Examiner*—Andrew Lee

(57) ABSTRACT

Systems and methods are described that that analyze Layer 2 network performance and identify problems without having to disrupt customer service. Embodiments employ a two-phase approach to identify network problems. For an ingress switch, embodiments monitor frame relay Management Information Base (MIB) port and channel objects. A trouble ticket with various test results may be issued and a network work center notified with recommendations that include switch checking, network checking, Layer 1 access testing and network connectivity testing.

19 Claims, 10 Drawing Sheets

LAYER 2 NETWORK RULE-BASED NON-INTRUSIVE TESTING VERIFICATION METHODOLOGY

BACKGROUND OF THE INVENTION

The invention relates generally to Layer 2 network performance monitoring. More specifically, the invention relates to systems and methods that analyze Layer 2 network performance and identify problems without having to disrupt customer service.

When switch configuration or network connectivity problems occur in frame relay High-Speed Packet Switching (HSPS) Layer 2 (Data Link Layer) networks, customers may not lose their network connection, but experience degraded service. In today's telecommunications industry, telecommunications companies are striving for new network troubleshooting technologies. Most telecommunications companies rely on manual or semi-automated troubleshooting tools to locate Layer 2 network problems.

What is desired are systems and methods that perform non-intrusive testing to locate problems without disrupting customer service.

SUMMARY OF THE INVENTION

The inventors have discovered that it would be desirable to have systems and methods that analyze Layer 2 network performance and identify problems without having to disrupt customer service. Embodiments determine whether a Layer 2 network problem is related to Customer Premises Equipment (CPE), a Provider Edge (PE) (ingress) switch or the Layer 2 network configuration.

The network configuration includes PE switch settings, PE switch port settings, PE switch channel settings, frame thresholds, etc. A PE switch port has to be enabled to transmit frames, however, it may be configured as non-operational by mistake. A particular PE switch or port has to support a particular Permanent Virtual Circuit (PVC) or channel. If a PVC Identifier, Virtual Channel Identifier (VCI), or Virtual Path Identifier (VPI) is misconfigured, the customer's service will be impacted.

Embodiments employ a two-phase approach to identify network problems. For a PE switch, embodiments monitor frame relay port Management Information Base (MIB) objects, then monitor frame relay channel MIB objects. Port MIB objects relate to the customer facing port (facing the CPE) in an ingress PE switch. Channel MIB objects relate to both ingress and network facing ports in an ingress PE switch.

One aspect of the invention provides a method for analyzing Layer 2 network performance. Methods according to this aspect of the invention include defining a set of switch port Management Information Base (MIB) objects that comprise dynamic metrics and predefined metrics, for an ingress switch, acquiring values (counters) for the set of port MIB objects at predetermined intervals, analyzing the dynamic port object counter metrics using a difference obtained by subtracting a previous object counter from a subsequent object counter, analyzing the predefined port object counter metrics using their defined meanings, and based on a dynamic port object counter metric and/or a predefined port object counter metric, identifying whether a problem is related to upstream Customer Premises Equipment (CPE), the ingress switch, or a downstream network configuration.

Another aspect of the invention provides a method for analyzing Layer 2 network performance. Methods according to this aspect of the invention include defining a set of switch channel MIB objects that comprise dynamic metrics and predefined metrics, for the ingress switch, acquiring values (counters) for the set of channel MIB objects at predetermined intervals, analyzing the dynamic channel object counter metrics using a difference obtained by subtracting a previous object counter from a subsequent object counter, analyzing the predefined channel object counter metrics using their defined meanings, and based on a dynamic channel object counter metric and/or a predefined channel object counter metric, identifying a root cause that is related to customer network utilization, or a downstream network connectivity or configuration.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
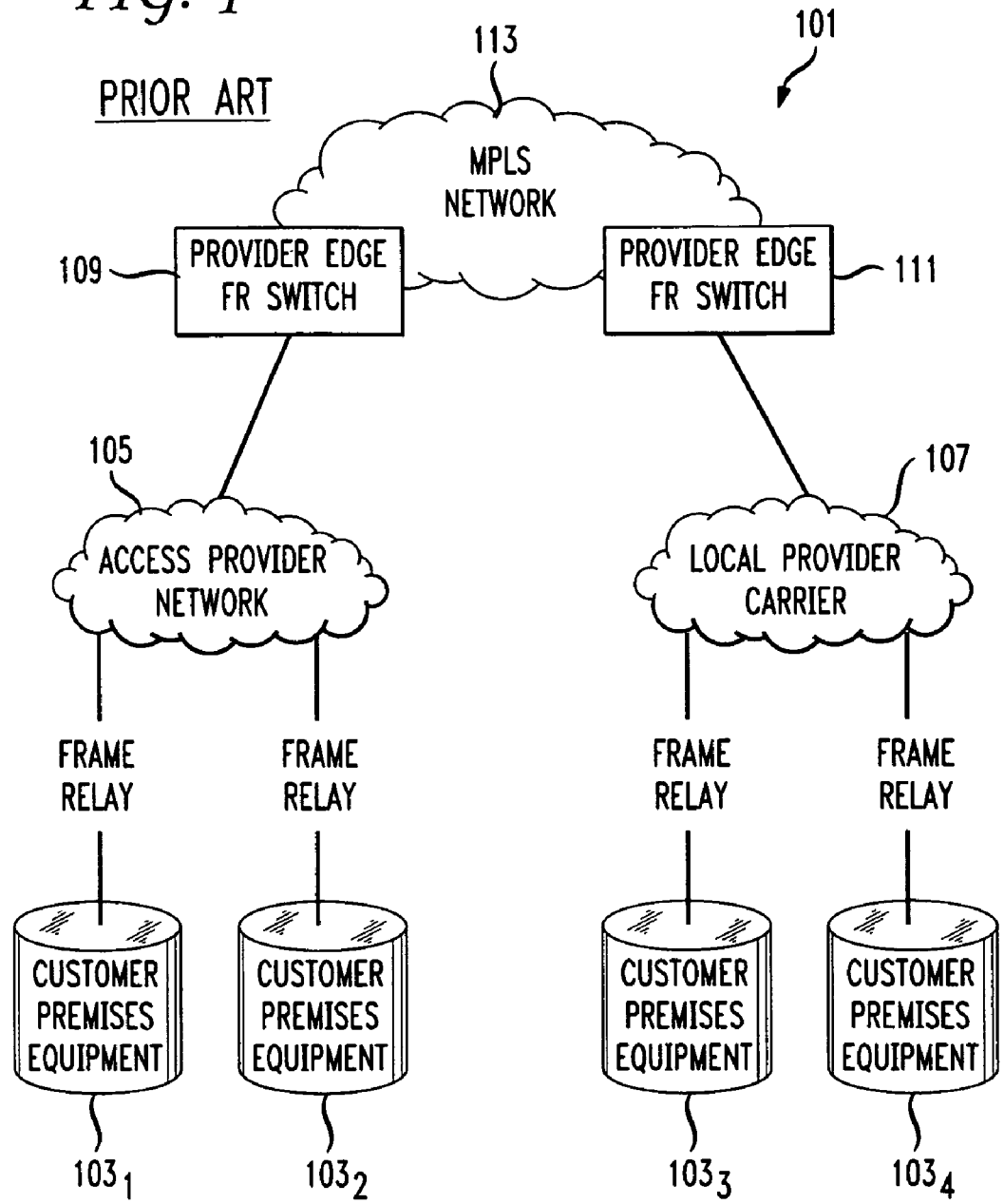
FIG. 1 is an exemplary frame relay High-Speed Packet Switching (HSPS) Layer 2 network.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions configured to analyze Layer 2 network problems, perform a root cause analysis, and identify the locations. Currently, technicians have to manually troubleshoot Layer 2 network problems which are a time consuming task. Components of the invention may be enabled as a modular framework and/or deployed as software as an application program tangibly embodied on a program storage device. The application code for execution can reside on a plurality of different types of computer readable media known to those skilled in the art.

In computer networking, frame relay is a data transmission technique used to send digital information. It is a message forwarding relay system in which frames are passed from one or many source points to one or many destination points via a series of intermediate node points. Network providers implement frame relay for voice and data as an encapsulation technique used between Local Area Networks (LANs) over a Wide Area Network (WAN). Each end user receives a private line or leased line to a frame relay node. The frame relay network handles the transmission over a frequently changing path transparent to all end users.

Frame relay places data in variable size frames and leaves any necessary error correction such as retransmission of data up to the destination points. For most services, the network provides a Permanent Virtual Circuit (PVC) or Virtual Channel (VC) which means that the customer sees a continuous, dedicated connection without having to pay for a full-time leased line, while the service provider routes each frame to its destination.

FIG. 1 shows a typical frame relay network 101 that is comprised of a plurality of Customer Premises Equipment (CPE) $103_1$, $103_2$, $103_3$, $103_4$, (collectively 103) an Access Provider (AP) network 105, a Local Exchange Carrier (LEC) 107, two Provider Edge (PE) switches 109, 111 and a Multiprotocol Label Switching (MPLS) network 113. MPLS networks are packet switched networks and operate at an OSI layer that lies between traditional definitions of Layers 2 and 3. MPLS provides a unified data-carrying service for both circuit-based clients and packet-switching clients and can be used to carry many different kinds of traffic, including Internet Protocol (IP) packets, as well as native Asynchronous Transfer Mode (ATM), Synchronous Optical Network (SONET) and Ethernet frames.

Each PE switch 109, 111 has ports facing the network 113 (network facing ports) and facing the CPE 103 (customer facing ports). Each PE switch 109, 111 has an associated MIB. Embodiments monitor one ingress PE switch and one or more egress PE switches (normally 3 to 5 egress switches).

Frame relay relays packets at Layer 2 of the Open Systems Interconnection (OSI) model rather than at Layer 3. A frame can incorporate packets from different protocols such as Ethernet and X.25. It varies in size up to a thousand bytes or more. Frame relay switches create VCs to connect remote LANs to a WAN. The frame relay network exists between a LAN border device, usually a-router and a network PE switch.

Each frame relay Protocol Data Unit (PDU) includes a flag field, an address field, Data Link Connection Identifier (DLCI) bits, a Forward Explicit Congestion Notification (FECN) bit, a Backward Explicit Congestion Notification (BECN) bit, a Discard Eligibility (DE) bit, an information field, and a Frame Check Sequence (FCS) field.

The flag field is used to perform high level data link synchronization which indicates the beginning and end of the frame with the unique pattern 01111110. To ensure that the 01111110 pattern does not appear somewhere inside the frame, bit stuffing and destuffing procedures are used.

Each address field may occupy either octet 2 to 3, octet 2 to 4, or octet 2 to 5, depending on the range of the address in use. A two-octet address field comprises the Address Field Extension (EA) bits and the Command/Response (C/R) bit.

The DLCI bit identifies the virtual connection so that the destination knows which information connection a frame belongs to. The DLCI has only local significance. A single physical channel can multiplex several different virtual connections.

The FECN, BECN and DE bits report congestion.

A system parameter defines the maximum number of data bytes that a host can pack into a frame. Hosts may negotiate the actual maximum frame length at call set-up time. The standard specifies the maximum information field size (supportable by any network) as at least 262 octets. Since end-to-end protocols typically operate on the basis of larger information units, frame relay recommends that the network support the maximum value of at least 1600 octets in order to avoid the need for segmentation and reassembling by end-users.

Since one cannot completely ignore the bit error-rate of the medium, each switch needs to implement error detection to avoid wasting bandwidth due to the transmission of erred frames. The error detection mechanism used in frame relay uses the Cyclic Redundancy Check (CRC) as its basis.

The frame relay network uses a simplified protocol at each switch. It achieves simplicity by omitting link-by-link flow control. When offered load is high, due to the bursts in some services, temporary overload at some frame relay switches causes a collapse in network throughput. Therefore, frame relay networks employ mechanisms to control congestion.

Congestion control includes admission control, Committed Information Rate (CIR), Committed Burst (BC) size and Excess Burst (BE) size.

Admission control provides the mechanism used in frame relay to ensure the guarantee of resource requirement once accepted. The network decides whether to accept a new connection request, based on the relation of the requested traffic descriptor and the network's residual capacity. The traffic descriptor consists of a set of parameters communicated to the switching nodes at call set-up time or at service-subscription time, and which characterizes the connection's statistical properties. The traffic descriptor includes CIR, BC and BE.

The CIR is an average rate in bps at which the network guarantees to transfer information units over a measurement interval T. T is defined as $$T = \frac{BC}{CIR}.$$

The BC is the maximum number of information units transmittable during the interval T and the BE is the maximum number of uncommitted information units in bits that the network will attempt to carry during the interval.

Once the network has established a connection, an ingress PE switch 109 and an egress PE switch 111 of the frame relay network must monitor the connection's traffic flow to ensure that the actual usage of network resources does not exceed this specification. Frame relay defines restrictions on the user's information rate and allows the network to enforce the end user's information rate and discard information when the subscribed access rate is exceeded.

Congestion notification keeps the network operating at its desired equilibrium point so that a certain Quality of Service (QOS) for the network can be met. FECN and BECN bits are incorporated into the address field. The FECN bit can be set to 1 to indicate that congestion was experienced in the direction of the frame transmission to inform the destination that congestion has occurred. The BECN bit can be set to 1 to indicate that congestion was experienced in the network in the direction opposite of the frame transmission to inform the source that congestion has occurred.

Figure 2:
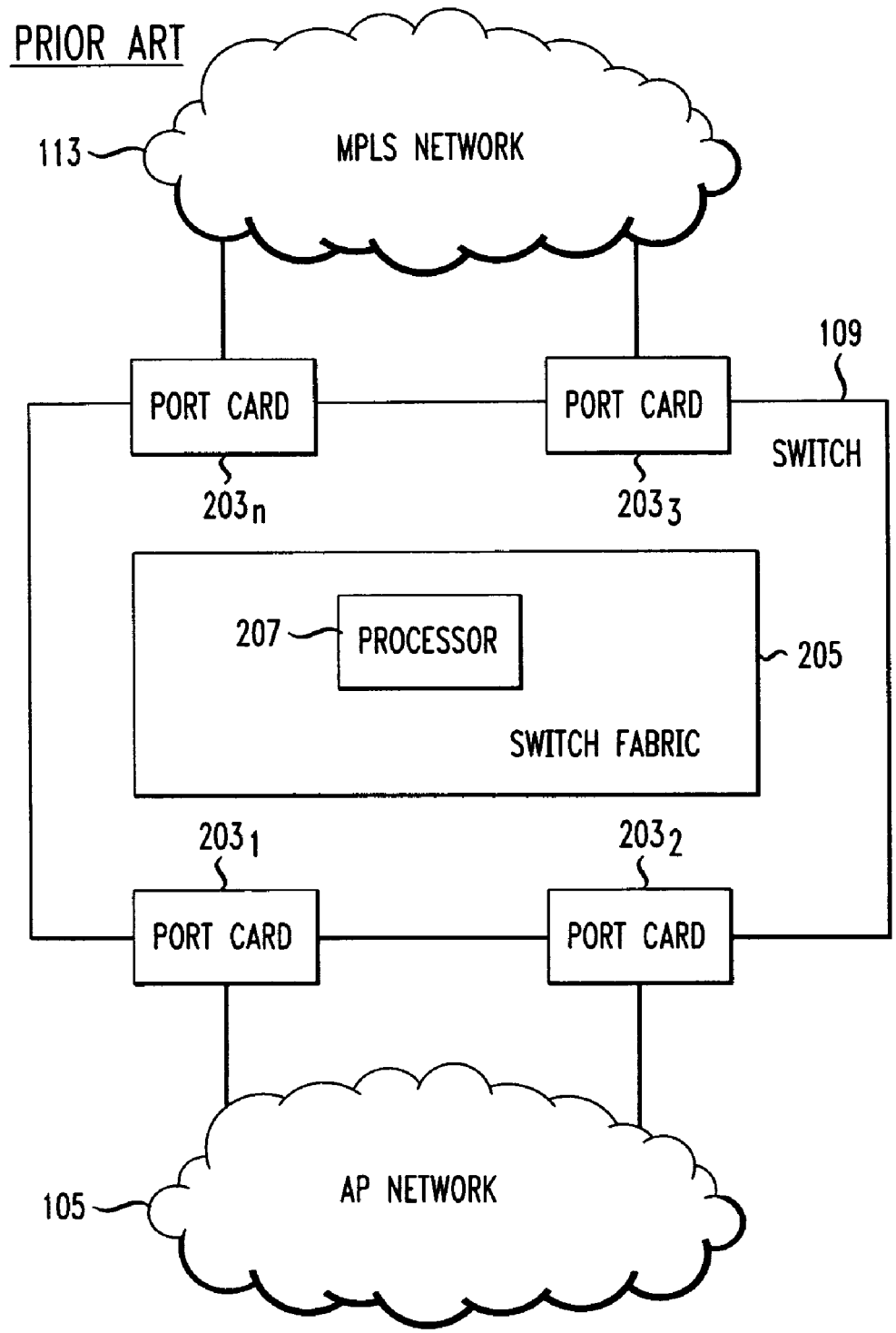
FIG. 2 is an exemplary switch architecture.

FIG. 2 shows a diagram of a typical Layer 2 switch 109, 111 architecture. It comprises one or more port cards $203_1$, $203_2$, $203_3$, ..., $203_n$ (collectively 203), each port card 203 having input and output processors and a switching fabric 205 that interconnects all port cards 203. The switch also contains a processor 207 functioning as the central controller for the switch. The switch performs two main functions for a received frame, a lookup based on the frame's destination address to identify the outgoing port and switching the frame to an output port.

A Layer 2 switch performs switching by storing destination address, source address, and Virtual Local Area Network (VLAN) information in Content Addressable Memory (CAM) tables. The switch sends Media Access Control (MAC) address update information to the switch processor 207. The switch updates the route processor from the switch processor 207 interface. Broadcasts use and route VCs to communicate with ports on other cards in the same switch.

Switching is defined as receiving an incoming frame on one interface and delivering it out through another interface. A switch is a device responsible for multiple functions such as filtering, flooding, and sending frames. The difference between Layer 2 and Layer 3 switching is the type of information inside the frame that is used to determine the correct output interface. In Layer 2 switching, frames are switched based on MAC address information, a sublayer of Layer 2. In Layer 3 switching, frames are switched based on Layer 3 information. A router switches packets using Layer 3 addressing information.

Layer 2 switching does not examine inside a packet for Network Layer information as does Layer 3 switching. A switch examines the frame destination address and sends it to the appropriate interface if the switch knows the destination address location. Layer 2 switching builds and maintains a switching table that keeps track of which MAC addresses belong to each switch port or switch interface.

If a Layer 2 switch does not know where to send a frame, it broadcasts the frame out to all its ports on the network, to learn the correct destination. When the frame reply is returned, the switch learns the location of the new address, and adds the information to the switching table.

Layer 2 switching is shareware based, using the MAC address from the host's Network Interface Controller (NIC) cards to filter the network. Layer 2 switches are fast because they do not examine the Layer 3 header information, instead examining the frame's hardware addresses before deciding to either forward the frame or drop it.

There are three distinct functions of Layer 2 switches, 1) address learning, 2) forward/filter decisions, and 3) loop avoidance.

Layer 2 switches remember the source hardware address of each frame received on an interface and enter this information into a MAC database. When a frame is received on an interface, the switch examines the destination hardware address and finds the exit interface in the MAC database. If multiple connections between switches are created for redundancy, network loops can occur. The Spanning Tree Protocol (STP) is used to stop network loops and allow redundancy.

The number of switch ports depends on how many port cards are installed at the switch. The addresses are stored in a bridge forwarding database. A switch determines which port a frame must be sent out to reach its destination. If the address is known, the frame is sent only on that port. If the address is unknown, the frame is flooded to all ports except the one from which it originated. When the switched network has redundant loops, the switch can prevent duplicate frames from traveling over multiple paths.

Switches have many spanning tree instances per switch and many ports on a switch. There are three primary frame switching modes. Cut-through where the switch checks the destination address and immediately begins forwarding the frame decreasing latency. Store and forward where the switch waits to receive the entire frame before forwarding. The entire frame is read, and a CRC is performed. If the CRC is bad, the frame is discarded. Latency increases as a function of frame length. And fragment-free (modified cut-through) where the switch reads the first 64 bytes before forwarding the frame. 64 bytes is the minimum number of bytes necessary to detect and filter out collision frames.

A switch uses its forwarding table address table when forwarding frames to devices. With an empty forwarding table, the switch must flood frames to all ports other than the one it arrived on. This is the least efficient way to transmit data.

Initially, the switch MAC address table is empty. For example, switch A sends a frame to switch C. When switch C receives the frame, it performs the following. Because its MAC table is empty, switch C must flood the frame to all other ports except the frame origin port. Switch C notes the source address of the originating device and associates it with port E0 in its MAC address table entry. The table uses the source address to populate the table, not the destination address. In this manner, switch C continues to learn addresses, continually updating its MAC table. As its MAC table becomes more complete, switching becomes more efficient because incoming frames are filtered to specific ports rather than being flooded out to all ports.

Broadcast and multicast frames are flooded to all ports other than the originating port. Broadcast and multicast addresses never appear as a frame's source address, so the switch does not learn these addresses.

Figure 3:
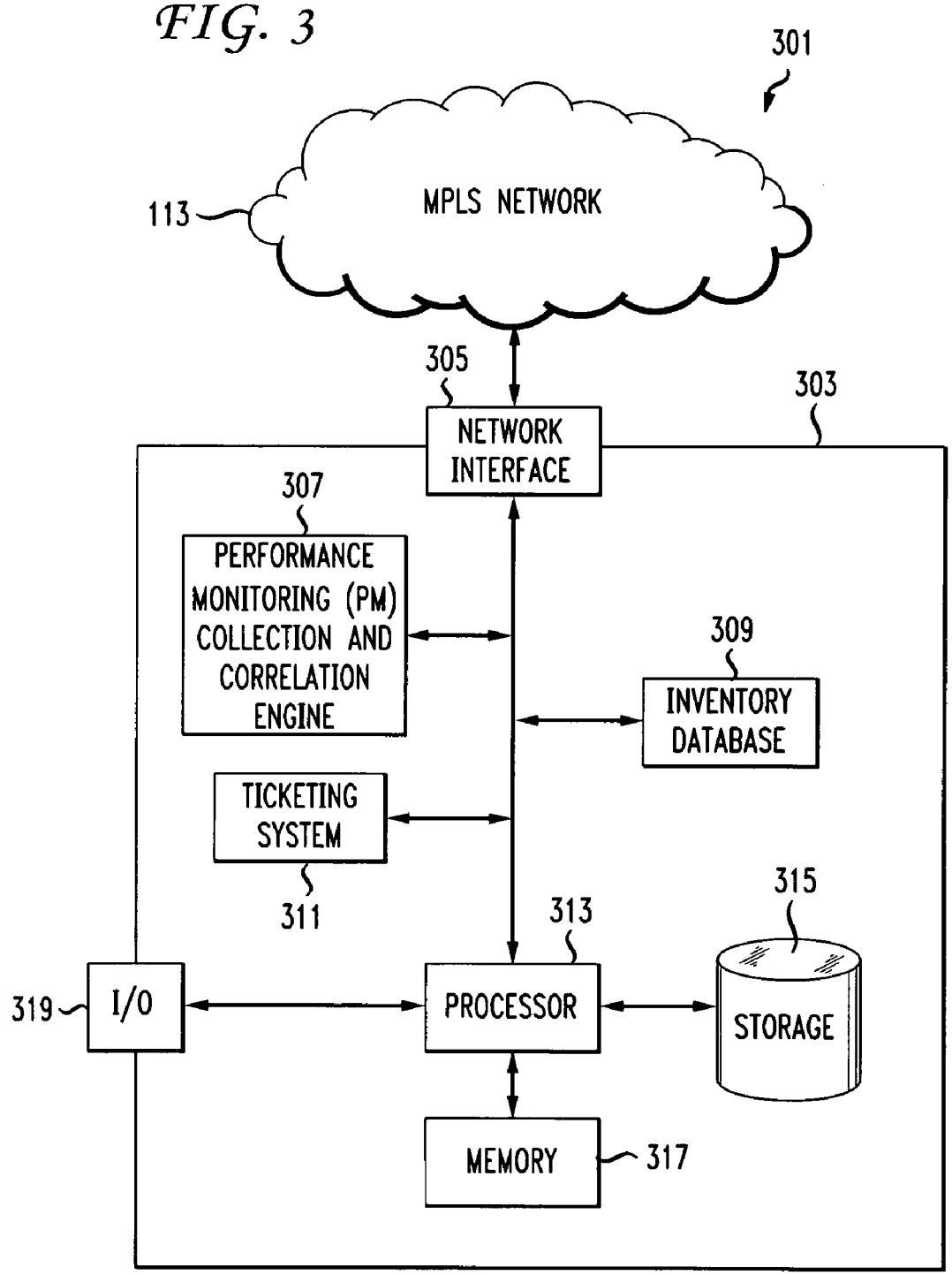
FIG. 3 is an exemplary system architecture.
Figure 4:
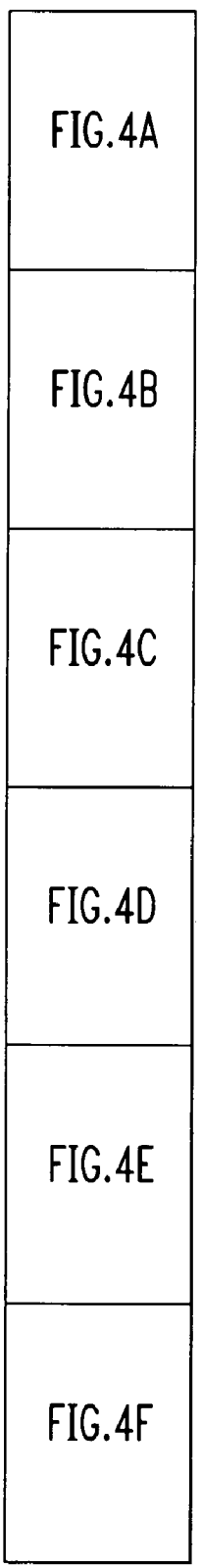
FIG. 4 is an exemplary method.
Figure 4A:
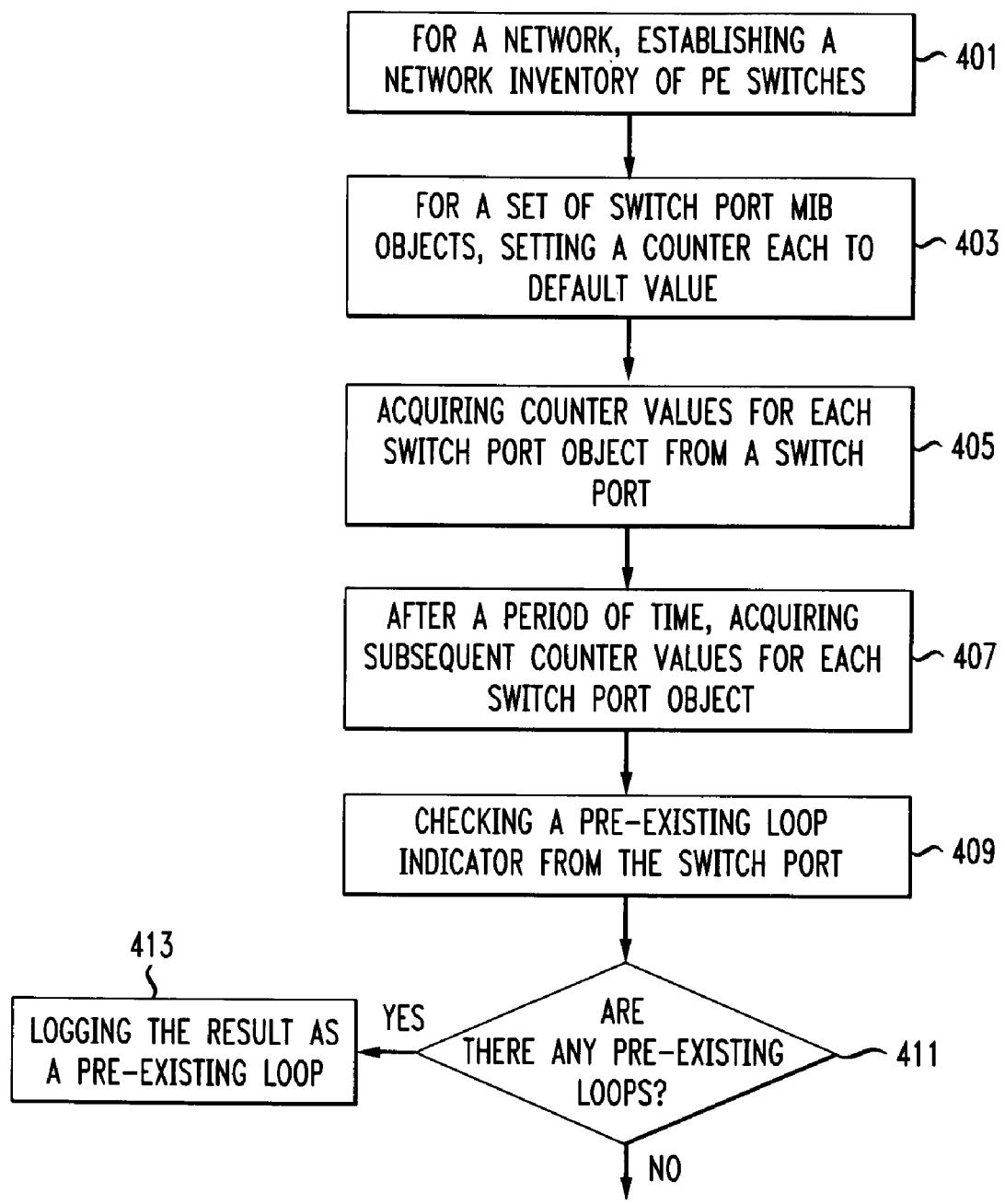
Figure 4B:
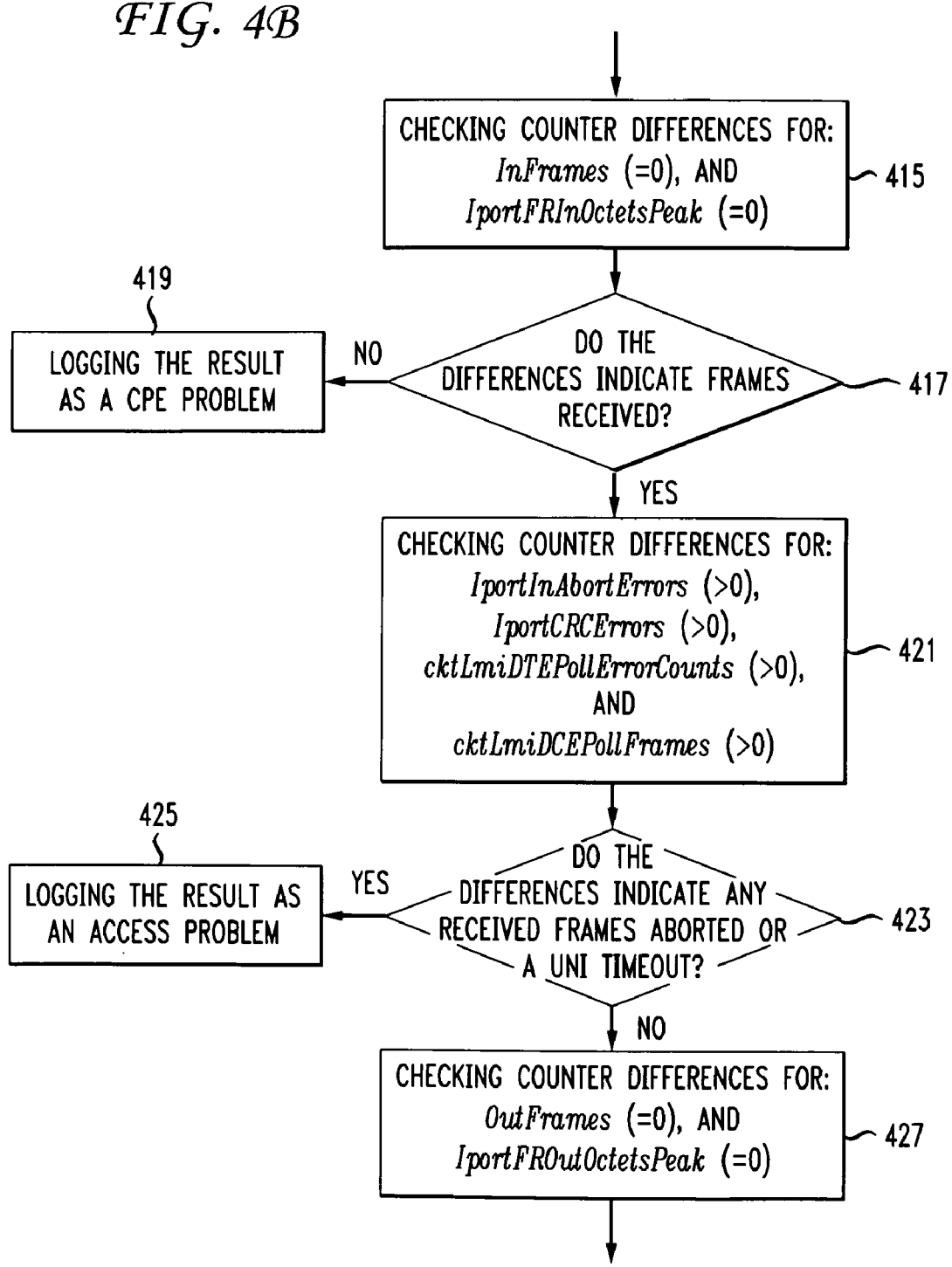
Figure 4C:
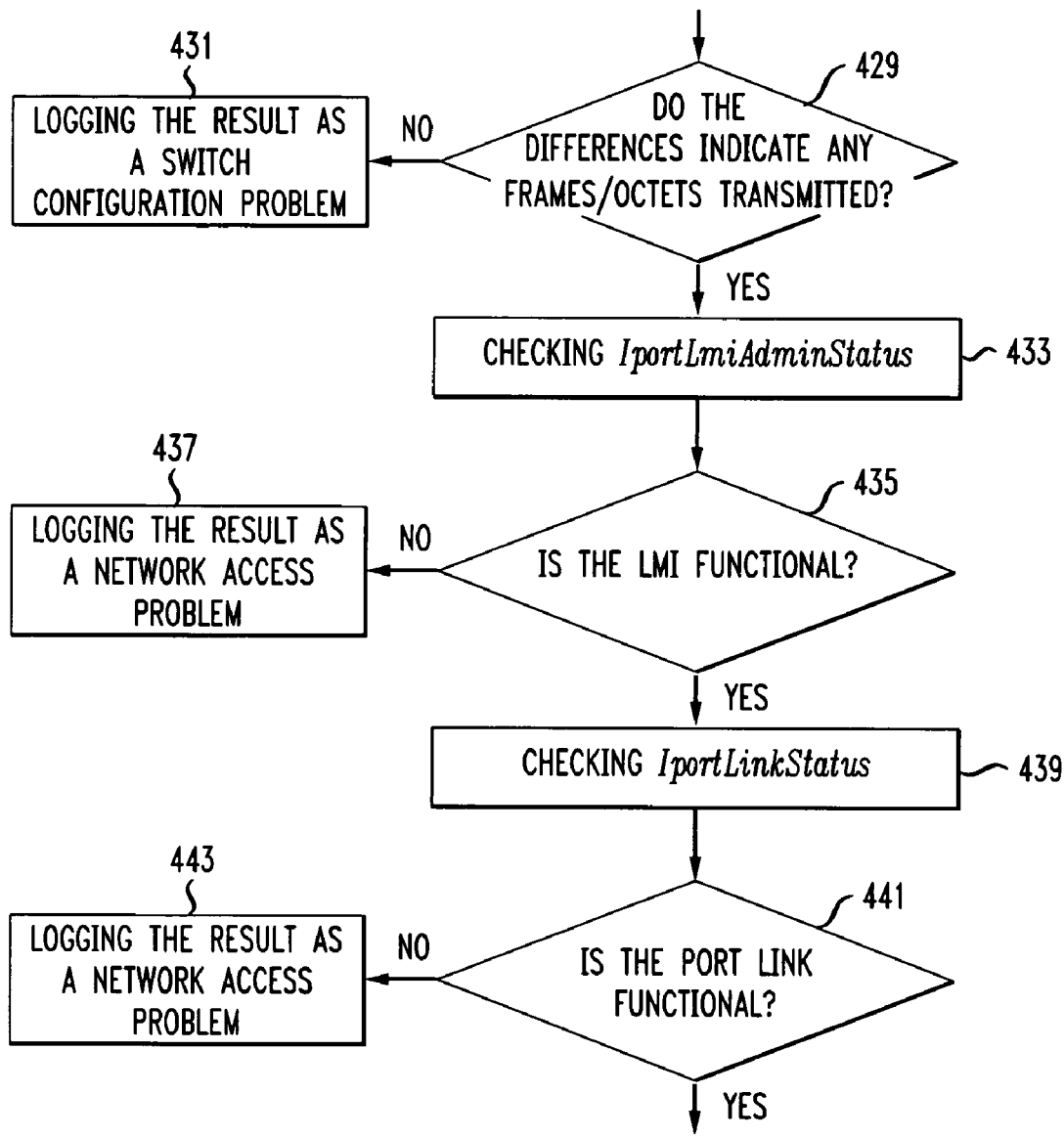
Figure 4D:
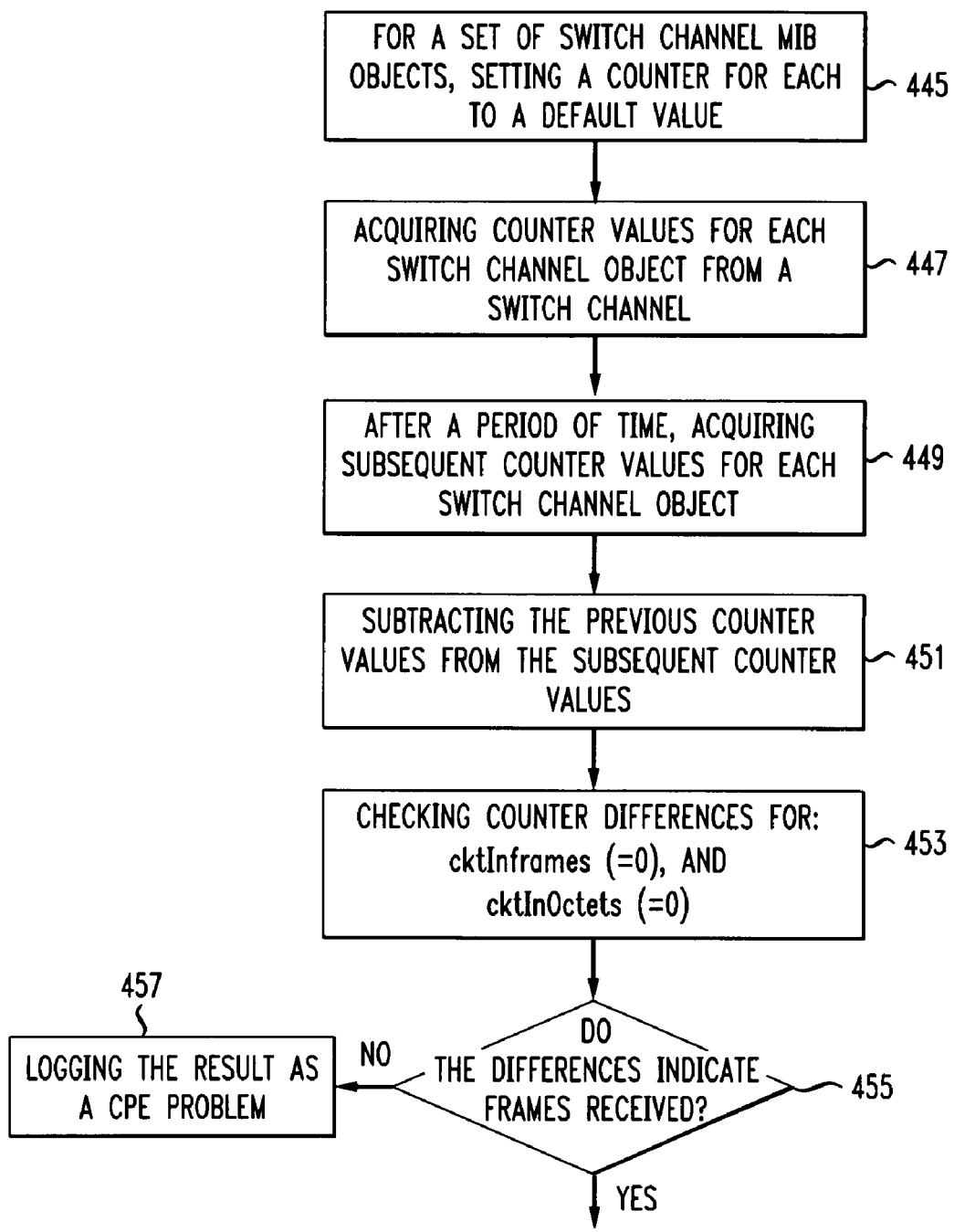
Figure 4E:
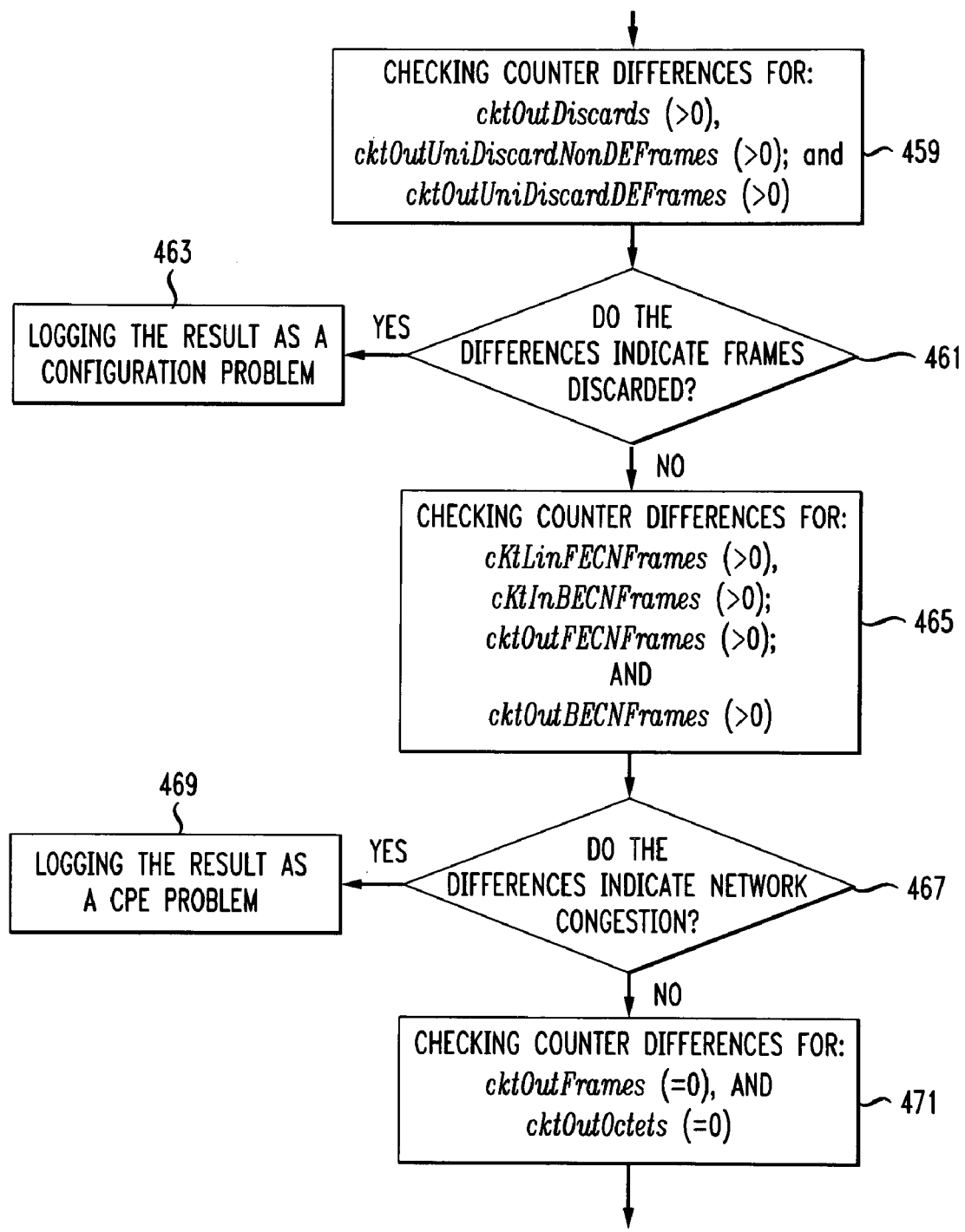
Figure 4F:
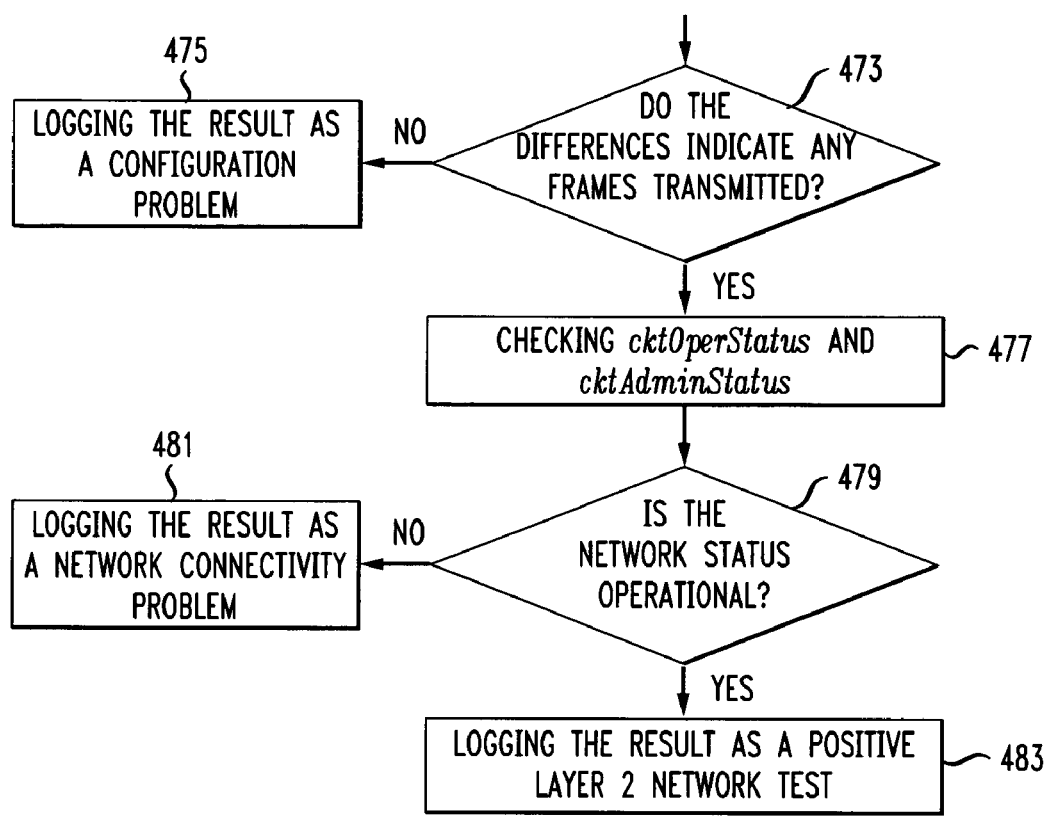

FIG. 3 shows an embodiment of a system 301 framework 303 and FIG. 4 shows a method. The framework 303 which may be part of a network management server includes a network interface 305 coupled to a network 113 and configured to acquire network topology information, network reachability information, as well as network status information to perform network management services. The network interface 305 is coupled to a Performance Monitoring (PM) collection and correlation engine 307, a network manager/inventory database 309, a ticketing system 311 and a processor 313. The processor 313 is coupled to storage 315, memory 317 and I/O 319.

The framework 303 stores acquired network PM data into a data store 315. The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. The invention may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration or alarm data. The I/O 319 allows for user interaction with the computer via peripheral devices such as a display, a keyboard, a pointing device, and others.

For a defined network, a network inventory of the frame relay network's Layer 2 PE switches is performed (step 401). The defined network may be deployed in production prior to implementing embodiments providing frame relay service to a customer. The PE switch inventory data may be stored in a database. A defined frame relay network may have hundreds of PE switches. Embodiments examine one ingress PE and one or more egress PE switches.

For a predefined set of frame relay port MIB objects (counters) comprising InFrames, IportFRInOctetsPeak, IportInAbortErrors, IportCRCErrors, cktLmiDTEPollErrorCounts, cktLmiDCEPollErrorCounts, OutFrames, IportFROutOctetsPeak, IportLmiAdminStatus and IportLinkStatus, memory is allocated and a default port object counter value for each is stored. Normally, a respective object counter default value is 0. The MIB objects are for frame relay (step 403).

From a predetermined PE ingress switch, the frame port objects are monitored and values corresponding for each are acquired by the system 303 (step 405). A command line interface is employed to acquire the MIB objects/counters from the switch.

Embodiments focus on a particular customer (service) at a given time, and a problem may be reported on one ingress PE switch port. Embodiments are triggered when a customer reports a service problem on a particular VC connection between his CPE and network provider. One trouble ticket can only be created for one VC. If the VC experiencing the problem is a T1 circuit (1.5 Mbps), it can carry at most 24 VCs each at a DS0 level. When the invention acquires that circuit, it retrieves ingress PE switch port information and VC information from an inventory system such as a Database of Record (DBOR). One VC can only connect to one ingress PE switch port while VCs can originate from one ingress PE switch port and travel to multiple egress PE switch ports. Embodiments acquire port objects by using port information and acquire channel objects by using VC information. After a predetermined period of time, for example, 30 seconds, another set of port counter values is acquired (step 407) and differences are obtained between a previous and subsequent set of variable values for dynamic objects. The differences and counter values are examined.

A pre-existing loop indicator indicates whether pre-existing loops are present between an ingress PE switch and CPE (step 409). If loops are present (step 411), the result is logged with a recommendation to check Layer 1 access and a work ticket may be issued (step 413). If no loops are present, the port counter differences for InFrames and IportFRInOctetsPeak are examined (step 415). InFrames is a metric for the number of frames received and IportFRInOctetsPeak is a metric for the number of frame bytes (octets) received. These objects represent the frames originating from CPE. If no frames and/or bytes are received (step 417), the result is logged as a CPE problem with a recommendation to check Layer 1 access (step 419) and a work ticket may be issued. No frames received indicate a CPE problem.

If frames have been received, the port counter differences for IportInAbortErrors, IportCRCErrors, cktLmiDTEPollErrorCounts, and cktLmiDCEPollErrorCounts are examined (step 421). IportInAbortErrors is a metric for the number of received frames that were aborted, IportCRCErrors is a metric for the number of received frames that were discarded due to CRC errors, cktLmiDTEPollErrorCounts is a metric for received User-Network Interface (UNI) sequence mismatches (Data Terminal Equipment (DTE) poll) and cktLmiDCEPollErrorCounts is a metric for the number of UNI signaling timeouts received. These objects relate to the frames sent from CPE to an ingress PE switch via an LEC. If these MIB objects report any errors, these errors relate to either CPE or the LEC. If any received frames were aborted or discarded due to a UNI timeout (step 423), the results are logged as an access problem with a recommendation to check Layer 1 access and a work ticket may be issued (step 425).

If no frames were aborted or discarded, the port counter differences for OutFrames and IportFROutOctetsPeak are examined (step 427). OutFrames is a metric that indicates no frames were transmitted and IportFROutOctetsPeak is a metric that indicates no frame bytes (octets) were transmitted. These objects relate to the frames transmitted from the ingress PE switch port. If no frames or octets were transmitted (step 429), the results are logged as a switch configuration problem with a recommendation to check alarm threshold settings and port configuration, and a work ticket may be issued (step 431). No frames transmitted from the PE switch port could indicate a port failure and an alarm should have been generated. Presuming no alarm was generated, a recommendation to check if the alarm threshold setting is correct is issued.

If frames or octets were transmitted, the port predefined value for IportLMIAdminStatus is examined (step 433). IportLMIAdminStatus is a metric that indicates whether Local Management Interface (LMI) administration status is either up (functioning) or down (nonfunctioning) and may relate to a configuration issue in an LEC network. If LMI status is down (step 435), the result is logged as a network access problem with a recommendation to check LMI protocol configuration settings and a work ticket may be issued (step 437).

If the LMI status is functioning, the port value for IportLinkStatus is examined (step 439). IportLinkStatus is a metric that indicates whether port link status is either up (functioning) or down (nonfunctioning) and indicates whether a physical link between a PE switch and CPE is up or down. If port link status is down (step 441), the result is logged as a network access problem with a recommendation to check Layer 1 access and a work ticket may be issued (step 443).

The above embodiment provides the first phase of frame relay Layer 2 ingress PE switch port testing. The following provides frame relay Layer 2 ingress PE switch channel testing.

For a predefined set of frame channel MIB objects (channel counters) cktInFrames, cktInOctets, cktOutDiscards, cktOutUniDiscardNonDEFrames, cktOutUniDiscardDEFrames, cktInFECNFrames, cktInBECNFrames, cktOutFECNFrames, cktOutBECNFrames, cktOutFrames, cktOutOctets, cktOperStatus and cktAdminStatus, memory is allocated and a default port counter value for each is stored (step 445).

From the ingress PE switch, the frame channel objects are monitored and values corresponding for each are acquired by the system 303 (step 447). Embodiments test a plurality of VCs. After a predetermined period of time, for example, 30 seconds, another set of channel counter values is acquired (step 449) and differences are obtained between a previous and subsequent set of variable values for dynamic objects (step 451). The differences and counter values are examined.

Channel counter differences for cktInFrames determine if frames were received and cktInOctets determines whether bytes (octets) were received (step 453). If no frames and/or octets have been received (step 455), the results are logged as a CPE problem with a recommendation to check Layer 1 access and a work ticket may be issued (step 457).

If frames have been received, channel counter differences for cktOutDiscards, cktOutUniDiscardNonDEFrames, and cktOutUniDiscardDEFrames are examined (step 459). cktOutDiscards is a metric for frames transmitted that were discarded, cktOutUniDiscardNonDEFrames is a metric for how many transmitted frames were discarded without the DE bit set and cktOutUniDiscardDEFrames is a metric for how many transmitted frames were discarded with the DE bit set. These objects relate to the transmission status of the discarded frames. If any received frames were discarded (step 461), the results are logged as a switch configuration problem with a recommendation to check the switch configuration settings and a work ticket may be issued (step 463).

If received frames were not discarded, the channel counter differences for cktInFECNFrames, cktInBECNFrames, cktOutFECNFrames and cktOutBECNFrames are examined (step 465). cktInFECNFrames is a metric for the number frames received with FECNs, cktInBECNFrames is a metric for the number of frames received with BECNs, cktOutFECNFrames is a metric for the number frames transmitted with the FECN bit set and cktOutBECNFrames is a metric for how many frames transmitted with the BECN bit set. These objects relate to network congestion or a traffic jam. If network congestion is detected (step 467), the results are logged as a CPE problem with a recommendation to check utilization speed and port speed configuration settings and a work ticket may be issued (step 469). For example, if a customer purchased a T1 service but sends more traffic than a T1 port can handle, a traffic jam occurs.

If there is no network congestion, the channel counter differences for cktOutFrames and cktOutOctets are examined (step 471). cktOutFrames is a metric indicating whether no frames were transmitted and cktOutOctets is a metric indicating whether any bytes (octets) were transmitted. These objects relate to the transmitted frames. If no frames were transmitted (step 473), the results are logged as a network configuration problem with a recommendation to check the network configuration and a work ticket may be issued (step 475).

If frames were transmitted, the channel predefined values for cktOperStatus and cktAdminStatus are examined (step 477). cktOperStatus is a metric indicating what the VC operation status is (0=invalid, 1=inactive, and 2=active) and cktAdminStatus is a metric indicating what the VC administration status is (0=invalid, 1=inactive, and 2=active). These relate to Operational and Administrative status. If the network status is invalid (step 479), the results are logged as a network connectivity problem with a recommendation to check network connectivity and a work ticket may be issued (step 481). Network connectivity is between an ingress PE switch and egress PE switches or remote CPEs. Embodiments check network configurations to see if network connectivity is enabled or active.

If the network status is inactive or active, the results are logged as a positive network Layer 2 test (step 483).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for analyzing Layer 2 network performance comprising:

defining a set of switch port Management Information Base (MIB) objects that comprise dynamic metrics and predefined metrics;

for an ingress switch, acquiring values (counters) for the set of port MIB objects at predetermined intervals;

analyzing the dynamic port object counter metrics using a difference obtained by subtracting a previous object counter from a subsequent object counter;

analyzing the predefined port object counter metrics using their defined meanings; and based on a dynamic port object counter metric and/or a predefined port object counter metric, identifying whether a problem is related to upstream Customer Premises Equipment (CPE), the ingress switch, or a downstream network configuration.

2. The method according to claim 1 wherein the dynamic port objects comprise InFrames, IportFRInOctetsPeak, IportInAbortErrors, IportCRCErrors, cktLmiDTEPollErrorCounts, cktLmiDCEPollErrorCounts, OutFrames and IportFROutOctetsPeak.

3. The method according to claim 1 wherein the predefined port objects comprise IportLmiAdminStatus and IportLinkStatus.

4. The method according to claim 1 further comprising issuing a trouble ticket to a network work center for a CPE problem, ingress switch problem, or network configuration depending on problem identification.

5. The method according to claim 1 further comprising:

examining a pre-existing loop indicator that indicates whether pre-existing loops are present between the ingress PE switch and CPE; and if the pre-existing loop indicator indicates loops are present, logging a result as a recommendation to check Layer 1 access.

6. The method according to claim 2 further comprising:

examining the port counter differences for InFrames and IportFRInOctetsPeak; and if the InFrames or IportFRInOctetsPeak counters equal zero, logging a result as a CPE problem with a recommendation to check Layer 1 access.

7. The method according to claim 2 further comprising:

examining the port counter differences for IportInAbortErrors, IportCRCErrors, cktLmiDTEPollErrorCounts and cktLmiDCEPollErrorCounts; and if the IportInAbortErrors, IportCRCErrors, cktLmiDTEPollErrorCounts or cktLmiDCEPollErrorCounts counters are greater than zero, logging a result as an access problem with a recommendation to check Layer 1 access.

8. The method according to claim 2 further comprising:

examining the port counter differences for OutFrames and IportFROutOctetsPeak; and if the OutFrames or IportFROutOctetsPeak counters equal zero, logging a result as a switch configuration problem with a recommendation to check alarm threshold settings and port configuration.

9. The method according to claim 3 further comprising:

examining the port predefined value for IportLMIAdminStatus; and if the IportLMIAdminStatus status is down (nonfunctioning), logging a result as a network access problem with a recommendation to check Local Management Interface (LMI) protocol configuration settings.

10. The method according to claim 3 further comprising:

examining the port predefined value for IportLinkStatus; and if the IportLinkStatus status is down (nonfunctioning), logging a result as a network access problem with a recommendation to check Layer 1 access.

11. The method according to claim 1 further comprising:
defining a set of switch channel MIB objects that comprise dynamic metrics and predefined metrics;
for the ingress switch, acquiring values (counters) for the set of channel MIB objects at predetermined intervals;
analyzing the dynamic channel object counter metrics using a difference obtained by subtracting a previous object counter from a subsequent object counter;
analyzing the predefined channel object counter metrics using their defined meanings; and
based on a dynamic channel object counter metric and/or a predefined channel object counter metric, identifying a root cause that is related to customer network utilization, or a downstream network connectivity or configuration.

12. The method according to claim 11 wherein the dynamic channel objects comprise cktInFrames, cktInOctets, cktOutDiscards, cktOutUniDiscardNonDEFrames, cktOutUniDiscardDEFrames, cktInFECNFrames, cktInBECNFrames, cktOutFECNFrames, cktOutBECNFrames, cktOutFrames and cktOutOctets.

13. The method according to claim 11 wherein the predefined channel objects comprise cktOperStatus and cktAdminStatus.

14. The method according to claim 11 further comprising issuing a trouble ticket to a network work center for a root cause related to customer network utilization, network connectivity or network configuration.

15. The method according to claim 12 further comprising:
examining the channel counter differences for cktInFrames and cktInOctets; and
if the cktInFrames or cktInOctets counters equal zero, logging a result as a CPE problem with a recommendation to check Layer 1 access.

16. The method according to claim 12 further comprising:
examining the channel counter differences for cktOutDiscards, cktOutUniDiscardNonDEFrames and cktOutUniDiscardDEFrames; and
if the cktOutDiscards, cktOutUniDiscardNonDEFrames and cktOutUniDiscardDEFrames counters are greater than zero, logging a result as a switch configuration problem with a recommendation to check the switch configuration settings.

17. The method according to claim 12 further comprising:
examining the channel counter differences for cktInFECNFrames, cktInBECNFrames, cktOutFECNFrames and cktOutBECNFrames; and
if the cktInFECNFrames, cktInBECNFrames, cktOutFECNFrames or cktOutBECNFrames counters are greater than zero, logging a result as a CPE problem with a recommendation to check network utilization speed and port speed configuration settings.

18. The method according to claim 12 further comprising:
examining the channel counter differences for cktOutFrames and cktOutOctets; and
if the cktOutFrames or cktOutOctets counters equal zero, logging a result as a network configuration problem with a recommendation to check the network configuration.

19. The method according to claim 13 further comprising:
examining the channel predefined values for cktOperStatus and cktAdminStatus; and
if the cktOperStatus or cktAdminStatus status is invalid, logging a result as a network connectivity problem with a recommendation to check network connectivity.

* * * * *